US012675945B2

(12) United States Patent
Anwar et al.

(10) Patent No.: US 12,675,945 B2
(45) Date of Patent: Jul. 7, 2026

(54) DATA AUGMENTATION FOR MODEL TRAINING

(71) Applicant: NVIDIA Corporation, Santa Clara, CA (US)

(72) Inventors: Malik Aqeel Anwar, Atlanta, GA (US); Tae Eun Choe, Belmont, CA (US); Zian Wang, Toronto (CA); Sanja Fidler, Toronto (CA); Minwoo Park, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 172 days.

(21) Appl. No.: 18/592,025

(22) Filed: Feb. 29, 2024

(65) Prior Publication Data

US 2024/0312123 A1      Sep. 19, 2024

Related U.S. Application Data

(60) Provisional application No. 63/452,802, filed on Mar. 17, 2023.

(51) Int. Cl.
| | |
|---|---|
| *G06T 15/50* | (2011.01) |
| *G06T 15/60* | (2006.01) |
(Continued)

(52) U.S. Cl.
CPC ............ *G06T 15/506* (2013.01); *G06T 15/60* (2013.01); *G06T 19/20* (2013.01); *H04N 23/698* (2023.01);
(Continued)

(58) Field of Classification Search
CPC ....... G06T 15/506; G06T 15/60; G06T 19/20; G06T 2219/2004; G06T 19/006; H04N 23/698; G06V 10/774
See application file for complete search history.

(56) References Cited

U.S. PATENT DOCUMENTS

| | | |
|---|---|---|
| 11,801,861 B2 | 10/2023 | Choe et al. |
| 11,816,790 B2 | 11/2023 | Devaranjan et al. |
(Continued)

OTHER PUBLICATIONS

Zhu et al. "Spatially-Varying Outdoor Lighting Estimation from Intrinsics", arXiv:2104.04160v1 (Year: 2021).*

*Primary Examiner* — Kee M Tung
*Assistant Examiner* — Xiaoming Wei
(74) *Attorney, Agent, or Firm* — Foley & Lardner LLP

(57) ABSTRACT

In various examples, systems and methods are disclosed that relate to data augmentation for training/updating perception models in autonomous or semi-autonomous systems and applications. For example, a system may receive data associated with a set of frames that are captured using a plurality of cameras positioned in fixed relation relative to the machine; generate a panoramic view based at least on the set of frames; provide data associated with the panoramic view to a model to cause the model to generate a high dynamic range (HDR) panoramic view; determine lighting information associated with a light distribution map based at least on the HDR panoramic view; determine a virtual scene; and render an asset and a shadow on at least one of the frames, based at least on the virtual scene and the light distribution map, the shadow being a shadow corresponding to the asset.

20 Claims, 14 Drawing Sheets

(51) Int. Cl.
    *G06T 19/20*     (2011.01)
    *G06V 10/774*     (2022.01)
    *H04N 23/698*     (2023.01)

(52) U.S. Cl.
    CPC .... *G06T 2219/2004* (2013.01); *G06V 10/774*
        (2022.01)

(56)         References Cited

U.S. PATENT DOCUMENTS

| | | | |
|---|---|---|---|
| 2007/0091083 A1* | 4/2007 | Yamada | A63F 13/57 |
| | | | 345/419 |
| 2020/0260006 A1* | 8/2020 | Pan | B60R 1/26 |
| 2021/0073955 A1* | 3/2021 | Zhang | G06T 5/92 |
| 2022/0101112 A1 | 3/2022 | Brown et al. | |
| 2022/0122001 A1 | 4/2022 | Choe et al. | |
| 2023/0004801 A1 | 1/2023 | Farabet et al. | |
| 2023/0229919 A1 | 7/2023 | Kar et al. | |
| 2023/0368459 A1* | 11/2023 | Garon | G06T 15/60 |
| 2024/0112428 A1* | 4/2024 | Levi | G06T 19/006 |
| 2024/0249442 A1* | 7/2024 | Maschmeyer | G06V 20/20 |

* cited by examiner

Figure 2A:
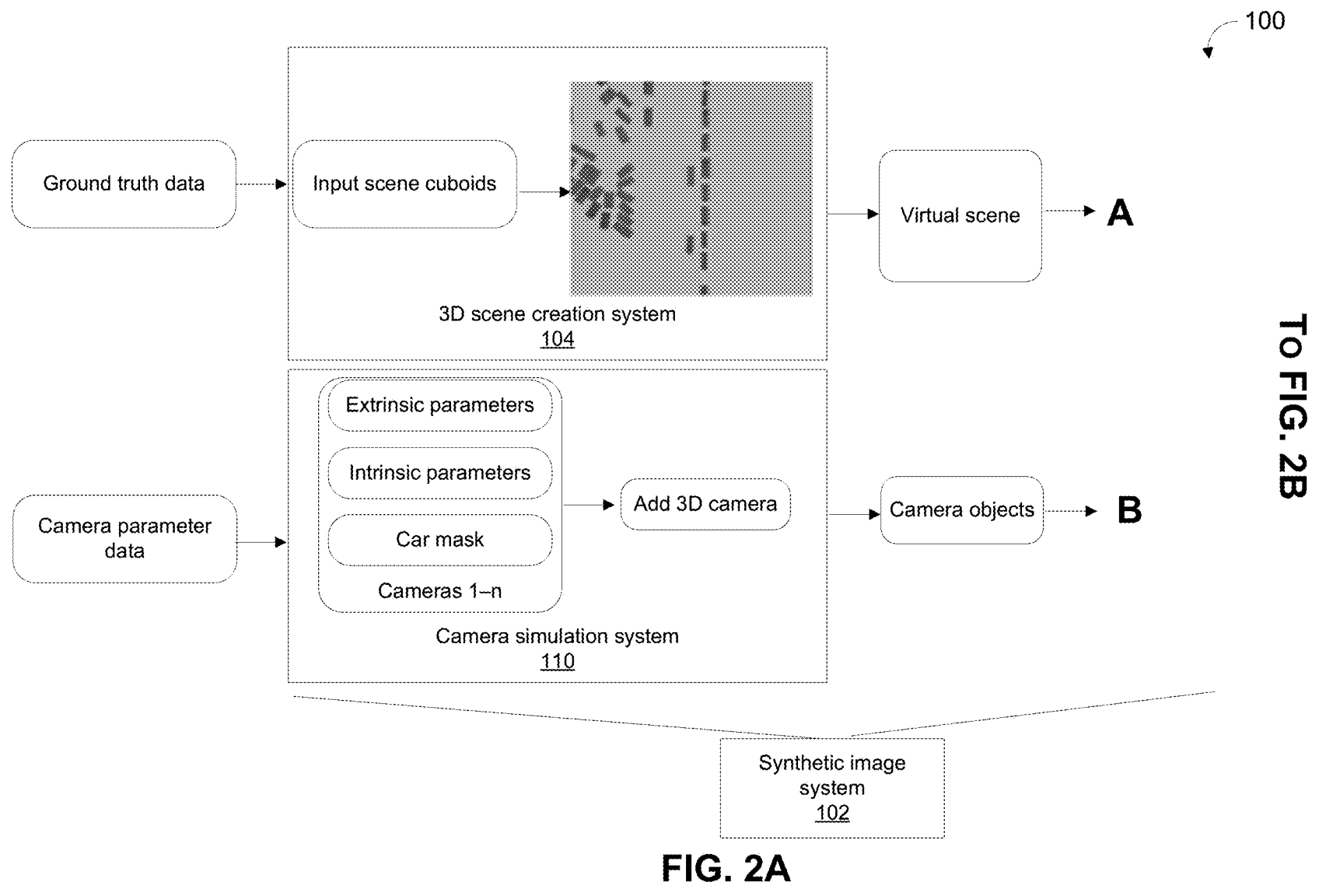

Virtual scene

Input scene cuboids 3D scene creation system
104

Ground truth data

B

Camera objects

Add 3D camera

Extrinsic parameters

Intrinsic parameters

Car mask

Cameras 1–n

Camera simulation system
110

Camera parameter data

Synthetic image system
102

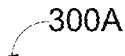
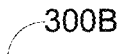
FIG. 3

500
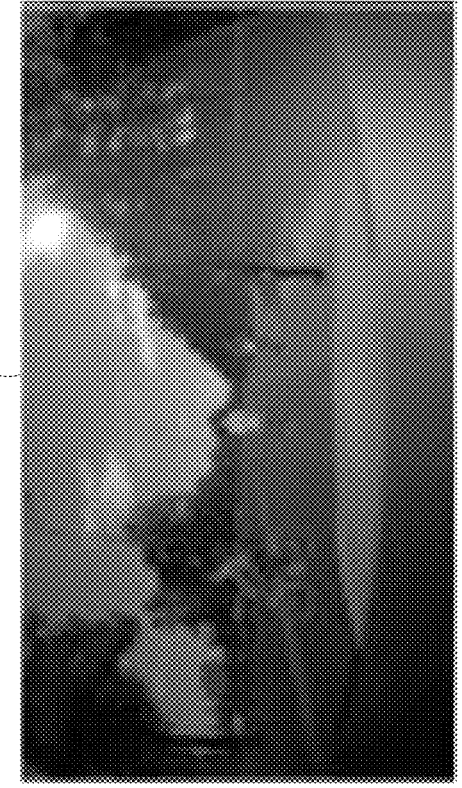
504
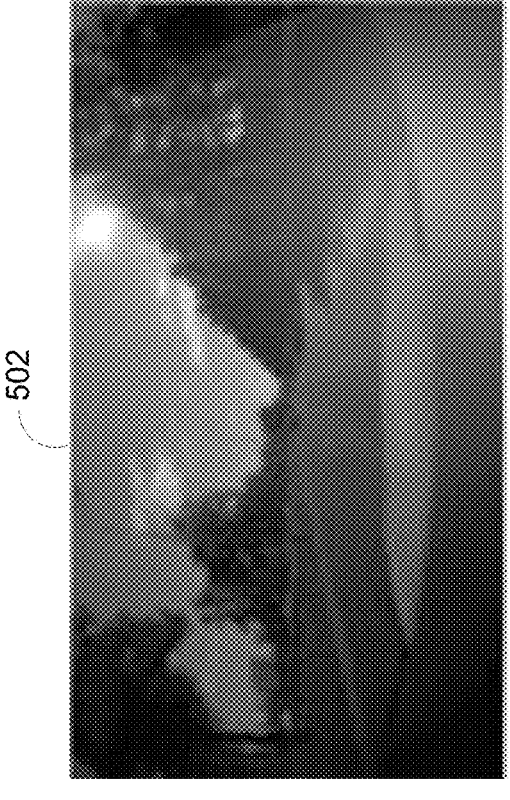
502
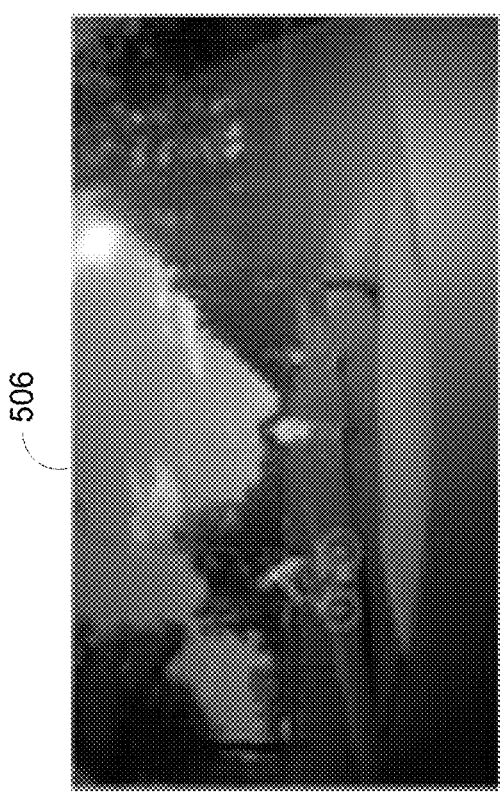
506
FIG. 5

700

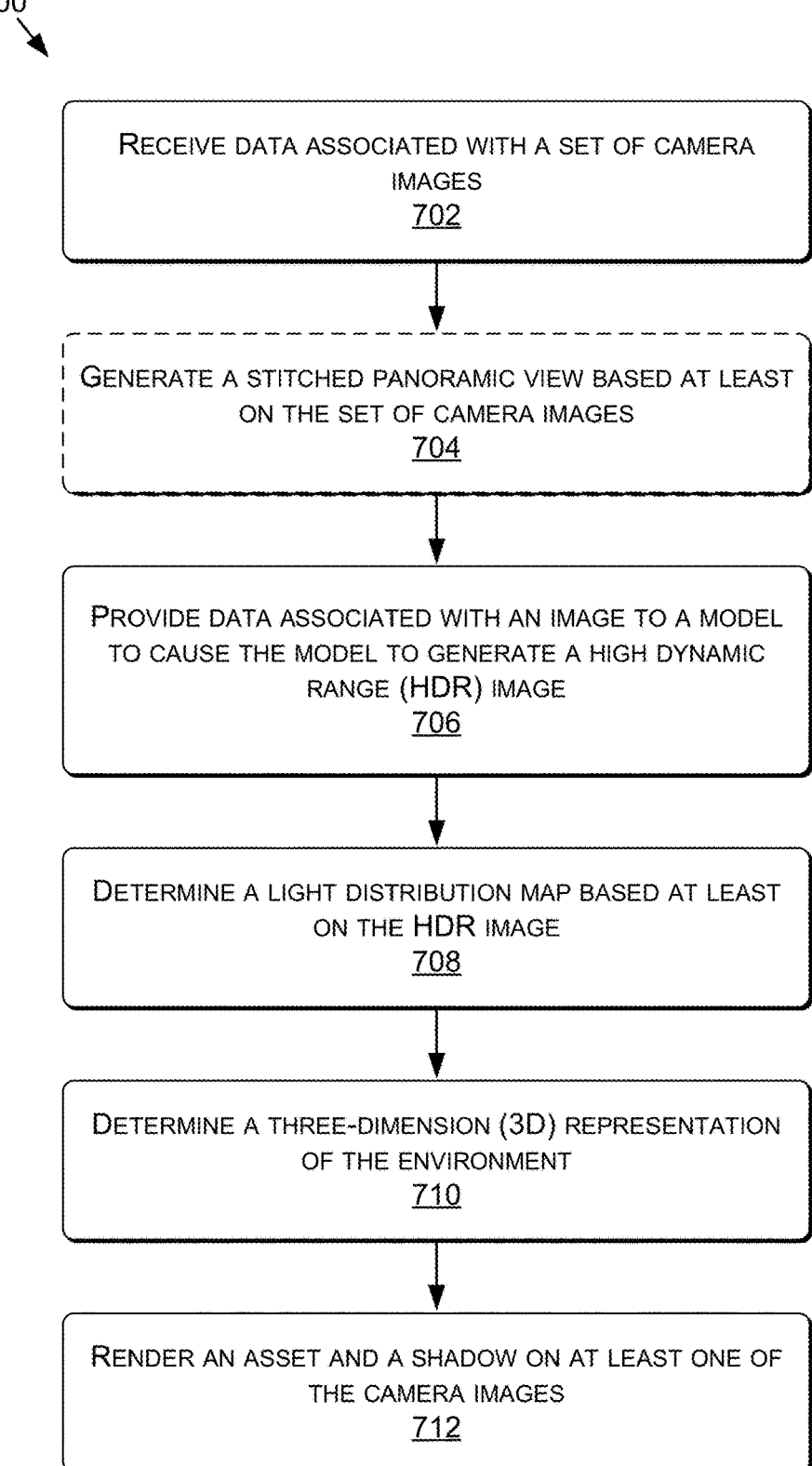

RECEIVE DATA ASSOCIATED WITH A SET OF CAMERA IMAGES
702

GENERATE A STITCHED PANORAMIC VIEW BASED AT LEAST ON THE SET OF CAMERA IMAGES
704

PROVIDE DATA ASSOCIATED WITH AN IMAGE TO A MODEL TO CAUSE THE MODEL TO GENERATE A HIGH DYNAMIC RANGE (HDR) IMAGE
706

DETERMINE A LIGHT DISTRIBUTION MAP BASED AT LEAST ON THE HDR IMAGE
708

DETERMINE A THREE-DIMENSION (3D) REPRESENTATION OF THE ENVIRONMENT
710

RENDER AN ASSET AND A SHADOW ON AT LEAST ONE OF THE CAMERA IMAGES
712

FIG. 7

DATA AUGMENTATION FOR MODEL TRAINING

CROSS-REFERENCE TO RELATED APPLICATIONS

This application claims the benefit of U.S. Provisional Application No. 63/452,802 filed Mar. 17, 2023, the contents of which are hereby incorporated by reference in their entirety.

BACKGROUND

Many partial (SAE L2), conditional (L3), and high (L4) driving automation systems include perception systems (sometimes referred to as perception modules) that are trained using datasets containing thousands to millions of images. For example, to develop a vision-based perception system, individual images are collected while a vehicle is driven in various environments and under various conditions. These images are then inspected by humans and annotated with tags representing objects or agents found in the image. The resulting images and corresponding tags are then used to update parameters of trained machine learning models implemented by the perception systems to classify later-encountered objects or agents.

But the images in these datasets can lack the diversity needed to update/train the machine learning model to classify certain objects and agents with an appropriate degree of reliability. As an example, a vehicle can be driven to collect images for hundreds of hours on an interstate highway, but rarely will that vehicle encounter objects such as fire hydrants or bicycles. And it can be particularly challenging to train/update a model to detect objects and agents such as traffic hazards, pedestrians, children, bicycles, motorcycles, motorized bicycles, etc., as they are relatively infrequently observed and can be dangerous to capture in certain scenarios. This limited ability of vehicles to encounter and collect diverse image sets poses a significant challenge to the development of accurate and reliable perception detection systems.

SUMMARY

Embodiments of the present disclosure relate to data augmentation for training/updating perception models in autonomous or semi-autonomous systems and applications. Systems and methods are disclosed that use a multi-camera network trained/updated by augmenting 3D synthetic models with realistic lighting and shadow information on real images (e.g., images generated in the real-world using one or more sensors of a machine, such as a vehicle or robot). As such, the present systems and methods can address the long-tail distribution of commonly seen road objects and can reduce the domain gap within a real dataset. The systems and methods may use an end-to-end framework, where real data is used to create a minimalistic virtual scene, and 3D synthetic assets are placed in this virtual scene at a permissible region (e.g., a region of interest where the 3D synthetic assets are permitted to be placed and/or may be placed in real-world scenarios). The light distribution estimated from the input (e.g., RGB) images is used to light up or illuminate the virtual scene, and the camera parameters from the real data are used to render the synthetic assets in each camera frame. This multi-camera augmented data is used to update/ train a multi-camera network to detect 3D bounding boxes and a free-space region in the ego-coordinate system (e.g., world-space coordinate system centered at an origin on the ego-vehicle). In example embodiments, 3D environments may be represented by 3D cuboids and drivable space in BEV with the ego-machine as an origin. As such, the systems and methods described herein may tackle lighting estimation for real-world driving scenarios and re-purpose virtual object insertion as a way to generate training data for perception models (e.g., 2D or 3D perception models) which may be used for dynamic or static object detection (e.g., traffic hazard detection). As a result, and when tested on real-world scenarios, the network updated/trained (e.g., only) on the augmented dataset can detect the traffic hazard objects with increased precision and accuracy.

At least one aspect is related to one or more processors. The one or more processors can include one or more circuits to: estimate lighting information corresponding to one or more initial frames; recreate a virtual scene corresponding to the one or more initial frames using the lighting information; place one or more assets within the virtual scene; render one or more asset frames from within the virtual scene, at least one asset frame of the one or more asset frames including the one or more assets; and render an augmented frame including an original frame associated with the one or more initial frames augmented with the one or more assets from the one or more asset frames. In some implementations, the virtual scene is generated using a neural rendering field (NeRF). In some implementations, the virtual scene is generated using ground truth data corresponding the one or more initial frames, the ground truth data including at least one of 2D bounding shape information, 3D cuboid information, or free-space information. In some implementations, the virtual scene is further generated using at least one of intrinsic parameters or extrinsic parameters of one or more cameras that generated the one or more initial frames. In some implementations, the one or more asset frames includes only the one or more assets rendered, and other information in the virtual scene is not included in the rendering. In some implementations, the virtual scene is generated using image-based lighting according to the lighting information.

In some implementations, the one or more initial frames include a plurality of initial frames, and the lighting information is estimated, at least in part, by: generating a panoramic frame using the plurality of initial frames; updating the panoramic frame using in-painting to generate an updated panoramic frame; converting a low dynamic range (LDR) upper portion of updated panoramic frame from a LDR to a high dynamic range (HDR) to generate an updated HDR upper portion; combining the updated HDR upper portion with an LDR lower portion to generate a recombined panoramic frame; applying one or more filters to the recombined panoramic frame to generate a smoothed panoramic frame; and determining the lighting information using the smoothed panoramic frame. In some implementations, converting the LDR upper portion to generate the updated HDR upper portion is performed using one or more deep neural networks. In some implementations, the at least one filter of the one or more filters includes a Gaussian blur filter. In some implementations, the original frame includes one of the one or more initial frames. In some implementations, the original frame includes a frame captured at a same time as the one or more initial frames using a different image sensor than one or more cameras used to capture the one or more initial frames. In some implementations, the lighting information includes at least one of shadow information or shade information.

In some implementations, the one or more assets are placed in the virtual scene based at least on an evaluation of at least one of: one or more permissible regions within the virtual scene for the one or more assets; whether the one or more assets are occluded; or whether the one or more assets would collide with one or more other objects of features in the virtual scene. In some implementations, the evaluation of whether the one or more assets are occluded includes determining whether the one or more assets, when viewed from one or more viewpoints of one or more cameras used to generate the one or more initial frames, are visible to the one or more cameras. In some implementations, the rendering the one or more asset frames includes rendering a first asset frame including an asset map corresponding to the one or more assets and a second asset map including a shadow map. In some implementations, the rendering the augmented frame includes alpha compositing the asset map and the shadow map with the original frame to generate the augmented frame.

In some implementations, the one or more processors is included in at least one of: a control system for an autonomous or semi-autonomous machine; a perception system for the autonomous or semi-autonomous machine; a system for performing simulation operations; a system for performing digital twin operations; a system for performing light transport simulation; a system for performing collaborative content creation for 3D assets; a system for performing deep learning operations; a system for presenting at least one of augmented reality content, virtual reality content, or mixed reality content; a system for hosting one or more real-time streaming applications; a system implemented using an edge device; a system implemented using a robot; a system for performing conversational AI operations; a system that implements one or more large language models (LLMs); a system for generating synthetic data; a system incorporating one or more virtual machines (VMs); a system implemented at least partially in a data center; or a system implemented at least partially using cloud computing resources.

In some implementations, a system can include one or more processors to: estimate lighting information corresponding to one or more initial frames; recreate a virtual scene corresponding to the one or more initial frames using the lighting information; place one or more assets within the virtual scene; render one or more asset frames from within the virtual scene, at least one asset frame of the one or more asset frames including the one or more assets; and render an augmented frame including an original frame associated with the one or more initial frames augmented with the one or more assets from the one or more asset frames.

In some implementations, the system includes at least one of: a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for performing conversational AI operations, a system for generating synthetic data, a system incorporating one or more virtual machines (VMs), a system implemented at least partially in a data center, and/or a system implemented at least partially using cloud computing resources.

At least one aspect relates to a method. The method can include estimating, using one or more processing units of a machine, lighting information corresponding to one or more initial frames; recreating, using one or more processing units of a machine, a virtual scene corresponding to the one or more initial frames using the lighting information; placing, using one or more processing units of a machine, one or more assets within the virtual scene; rendering, using one or more processing units of a machine, one or more asset frames from within the virtual scene, at least one asset frame of the one or more asset frames including the one or more assets; and rendering, using one or more processing units of a machine, an augmented frame including an original frame associated with the one or more initial frames augmented with the one or more assets from the one or more asset frames.

At least one aspect relates to one or more processors. The one or more processors can include one or more circuits to: receive data associated with a set of frames representing an environment of a machine (e.g., a vehicle and/or the like), the set of frames captured using one or more cameras disposed on the machine; generate a panoramic view frame based at least on the set of frames; provide data associated with the panoramic view frame to a model to cause the model to generate a high dynamic range (HDR) panoramic view frame; determine lighting information associated with a light distribution map based at least on the HDR panoramic view frame; determine a virtual scene; and render, on at least one of the frames and based at least on the virtual scene and the light distribution map, an asset and a shadow corresponding to the asset.

In some implementations, when rendering the asset and the shadow, the one or more circuits are to: determine a random position and orientation for the asset based at least on the virtual scene, and render the asset and the shadow based at least on the random position and orientation. In some implementations, when rendering the asset and the shadow, the one or more circuits are to: determine a region of interest based at least on the virtual scene; determine a position and orientation for the asset based at least on the region of interest; and render the asset and the shadow based at least on the position and orientation for the asset.

In some implementations, when rendering the asset and the shadow, the one or more circuits are to: determine a first position and orientation for the asset based at least on the virtual scene; determine that the asset is occluded by at least one object in at least one frame of the set of frames based at least on the first position and orientation for the asset and a position and orientation of the at least one object in the virtual scene; determine a second position and orientation for the asset based at least on determining that the asset is occluded in the at least one frame; and render the asset and the shadow based at least on the second position and orientation for the asset. In some implementations, when rendering the asset and the shadow, the one or more circuits are to: determine a first position and orientation for the asset based at least on the virtual scene; determine that the asset is occluded in the at least one frame based at least on determining that a portion of the asset is overlapped by an object, the portion of the asset being overlapped by a threshold amount in the at least one frame; determine a second position and orientation for the asset based at least on determining that the asset is occluded in the at least one frame; and render the asset and the shadow based at least on the second position and orientation for the asset.

In some implementations, when determining the light distribution map, the one or more circuits are to: determine the light distribution map based at least on the panoramic view frame and the HDR panoramic view frame, where a first portion of the light distribution map corresponds to at least a portion of the panoramic view frame, and where a second portion of the light distribution map corresponds to at least a portion of the HDR panoramic view frame. In some implementations, when determining the virtual scene, the one or more circuits are to: determine the virtual scene to comprise a set of 3D cuboids or a neural radiance field (NeRF). In some implementations, when generating the panoramic view frame, the one or more circuits are to: generate the panoramic view frame based at least on determining a set of intrinsic parameters and extrinsic parameters associated with at least one camera of the plurality of cameras. In some implementations, generating the panoramic view frame, the one or more circuits are to: determine that the set of frames satisfy an overlap threshold; and generate the panoramic view frame based at least on determining that the set of frames satisfy the overlap threshold.

In some implementations, the processor is included in at least one of: a control system for an autonomous or semi-autonomous machine; a perception system for the autonomous or semi-autonomous machine; a system for performing simulation operations; a system for performing digital twin operations; a system for performing light transport simulation; a system for performing collaborative content creation for 3D assets; a system for performing deep learning operations; a system for presenting at least one of augmented reality content, virtual reality content, or mixed reality content; a system for hosting one or more real-time streaming applications; a system implemented using an edge device; a system implemented using a robot; a system for performing conversational AI operations; a system that implements one or more large language models (LLMs); a system for generating synthetic data; a system incorporating one or more virtual machines (VMs); a system implemented at least partially in a data center; or a system implemented at least partially using cloud computing resources.

At least one aspect relates to a system. The system can include one or more processors to: receive data associated with one or more frames corresponding to an environment provide data associated with the one or more frames to a model to cause the model to generate one or more high dynamic range (HDR) frames; determine lighting information associated with a light distribution map based at least on the one or more HDR frames; determine a virtual scene corresponding to an asset; and render, within at least one frame of the one or more frames and based at least on the virtual scene and the light distribution map, an asset and a shadow corresponding to the asset.

In some implementations, the system includes at least one of: a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for performing conversational AI operations, a system for generating synthetic data, a system incorporating one or more virtual machines (VMs), a system implemented at least partially in a data center, and/or a system implemented at least partially using cloud computing resources.

At least one aspect relates to a method. The method can include estimating lighting information corresponding to the one or more initial frames; recreating a virtual scene corresponding to the one or more initial frames using the lighting information; placing one or more assets within the virtual scene; rendering one or more asset frames from within the virtual scene, at least one asset frame of the one or more asset frames including the one or more assets; and rendering an augmented frame including an original frame associated with the one or more initial frames augmented with the one or more assets from the one or more asset frames.

At least one aspect relates to a method. The method can include receiving, using one or more processing units of a machine, data associated with a set of frames representing an environment of a vehicle, the set of frames captured by a plurality of cameras positioned in fixed relation relative to the vehicle; generating, using the one or more processing units of the machine, a panoramic view frame based at least on the set of frames; providing, using the one or more processing units of the machine, data associated with the panoramic view frame to a model to cause the model to generate a high dynamic range (HDR) panoramic view frame; determining, using the one or more processing units of the machine, lighting information associated with a light distribution map based at least on the HDR panoramic view frame; determining, using the one or more processing units of the machine, a virtual scene; and rendering, using the one or more processing units of the machine, an asset and a shadow on at least one of the frames, based at least on the virtual scene and the light distribution map, the shadow being a shadow corresponding to the asset.

BRIEF DESCRIPTION OF THE DRAWINGS

The present systems and methods for data augmentation for model training/updating in autonomous systems and applications are disclosed that involve augmentation data (e.g., images) that are later used to update or train machine learning-based systems (e.g., perception systems) that enable vehicle or machine automation.

FIGS. 2A and 2B are a block diagram illustrating an example data flow for a system of generating augmented training data for updating/training perception models, in accordance with some embodiments of the present disclosure;

FIG. 3 is an example of a real frame and an augmented frame generated in accordance with some embodiments of the present disclosure;

FIG. 5 is an example set of augmented frame, in accordance with some embodiments of the present disclosure;

FIG. 7 is a flow diagram of an example method for data augmentation, in accordance with some embodiments of the present disclosure;

DETAILED DESCRIPTION

Figure 1:
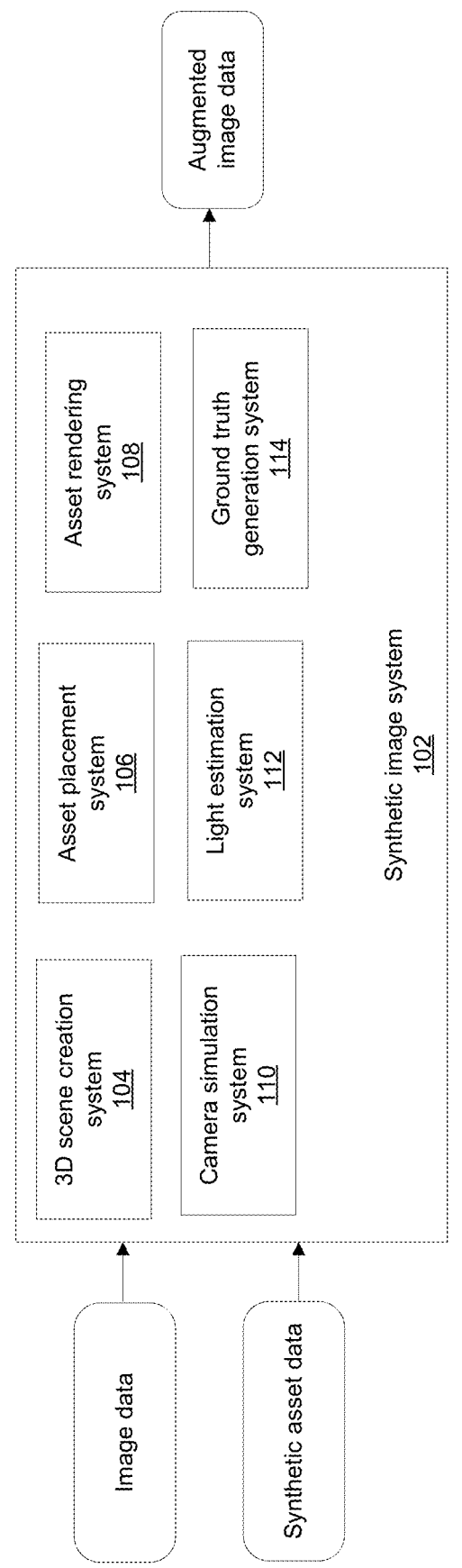
FIG. 1 is a block diagram illustrating an example system for generating augmented training data for updating/training perception models, in accordance with some embodiments of the present disclosure.

Systems and methods are disclosed related to data augmentation for updating/training perception models in autonomous or semi-autonomous systems and applications. Although the present disclosure may be described with respect to an example autonomous vehicle 800 (alternatively referred to herein as "vehicle 800," "ego-vehicle 800," "machine 800," or "ego-machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to data augmentation for updating/training perception models in autonomous or semi-autonomous machine technologies, this is not intended to be limiting, and the systems and methods described herein may be used in augmented reality, virtual reality, mixed reality, robotics, security and surveillance, autonomous or semi-autonomous machine applications, and/or any other technology spaces where model training may be used.

In various embodiments, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing language models—such as large language models (LLMs), systems for hosting real-time streaming applications, systems for presenting one or more of virtual reality content, augmented reality content, or mixed reality content, systems for performing light transport simulation, systems for performing collaborative content creation for 3D assets, systems for performing one or more generative AI operations, systems implemented at least partially using cloud computing resources, and/or other types of systems.

Perception systems play an important role for autonomous vehicles to navigate safely and accurately, where the models typically consume sensor data mounted on the vehicle, such as cameras, LiDAR and RADAR, and predict the properties of the surrounding environments. A challenge exists in detecting rarely-seen or less commonly observed objects—which is a crucial perception task to ensure road safety—due to the development of robust perception models requiring large amounts of high-quality training data. This becomes particularly challenging for objects such as traffic hazards, pedestrians, children, bicycles, motorbikes, etc., because potentially unsafe events involving these object types are rarely observed in real-world scenarios and are dangerous to capture or recreate. The limited availability of such data poses a challenge for developing accurate and reliable detection systems.

Object detection is a crucial component to any autonomous or semi-autonomous perception pipeline. For example, to generate an understanding of the surrounding environment, locations of dynamic and static objects need to be determined. Once an understanding of the surroundings is developed—such as in a world model representation—this information may be relied on when updating a world model or performing planning, control, navigation, and/or actuation operations.

Given that object detection is so important to autonomous or semi-autonomous machine control, the object detection pipeline-which may include one or more machine learning models, such as deep neural networks (DNNs)—is required to detect a wide range of objects. This range of objects may include anything from other actors in the environments (e.g., pedestrians and other vulnerable road users (VRUs), vehicles, bicyclists, etc.) as well as inanimate or static objects (e.g., hazards, traffic objects, construction or maintenance objects, etc.). Certain techniques for collecting data in the real-world lack the occurrence, variety of poses, and types for such a wide range of objects. To account for this, approaches are used to generate synthetic data and create virtual scenes and to collect data from the virtual scenes—but this often results in a clear domain gap between the simulated world and the real-world. While recent advances in game engines have reduced the domain gap, the simulated environments have yet to reach a desired level of precision or accuracy.

Some approaches use 3D obstacle detection due to obstacle detection being a critical part of autonomous or semi-autonomous driving, as it allows vehicles to detect and avoid potential collisions with objects on the road. While there are several sensor types—such as LiDAR, camera, RADAR, ultrasonic, and/or fusion thereof—that can be used for obstacle detection, camera sensors are particularly useful due to their low cost and longer detection ranges.

One approach is to use multiple view geometry such as stereo vision, where road hazards are detected using stereo vision. However, stereo vision can perform poorly when the features on the road have less detectable or discernable features. The advantage of geometry-based object detection is that it can detect any kind of objects; however, the false positive detection rate is usually higher than machine learning based methods.

Another approach to detect 3D obstacles involves a machine learning based method. Certain 3D obstacle detection systems use camera sensors only to extract bird's eye view (BEV) representations of 3D obstacles from multiple cameras. For example, features from the multiple cameras may be up-lifted to segmentation masks in a BEV representation.

Another approach uses image manipulation techniques, which are typically designed to benefit purposes such as visual effects, art creation, and augmented reality (AR), and have been investigated in various directions such as generative methods, scene reconstruction, and physics-based lighting estimation. Generative modeling can be used for image editing, but typically show promising results in art creation with user input such as semantic masks and text. In addition, these methods usually contain only 2D information and thus are insufficient to directly generate 3D data.

Reconstruction-based methods reconstruct scene components, and manipulate the underlying 3D representation to produce edited imagery. Some approaches separately optimize neural fields for each object in the scene as a scene graph, and allow for re-arranging objects within the scene. Other approaches reconstruct 3D assets such as cars from real-world driving sequences, and insert them into novel images with a learned neural compositor. However, these methods cannot handle complex lighting effects, and may struggle to capture rarely observed scenarios such as traffic hazards.

A further technique is lighting estimation and virtual object insertion, which is an important functionality for visual effects and AR, with the goal of placing virtual objects into real-world scenes in a way that is visually convincing. Given input images, these models estimate the scene lighting conditions and produce lighting representations such as spherical functions, sky models, environment maps, and volumetric representations. With the estimated lighting information, virtual objects created by computer graphics artists can be realistically inserted into the images and the lighting effects—such as cast shadows—can be properly handled. However, these approaches can struggle to capture rarely observed scenarios such as traffic hazards, and may not be as suitable for updating/training or validation set generation for updating/training an object detector to perform accurately and precisely on real-world data.

Certain aspects of this disclosure relate to systems and methods for augmenting the images stored in datasets to include representations of less-frequently encountered objects and agents. More specifically, methods described in this disclosure involve: receiving data associated with a set of initial frames (e.g., one or more camera images) representing an environment of a vehicle (e.g., an environment around a machine such as a vehicle), the set of initial frames captured by one or more cameras positioned in fixed relation relative to the vehicle; (optionally) generating a panoramic frame when the set of initial frames includes more than one initial frame; providing data associated with the panoramic frame to a model to cause the model to generate a high dynamic range (HDR) frame (referred to as a stitched HDR frame where multiple frames are provided as input); determine a light distribution map (e.g., a map representing lighting information) based at least on the HDR frame (or stitched HDR frame); determine a virtual scene; and render an asset and a shadow on at least one of the initial frames, based at least on the virtual scene and the light distribution map, the shadow being a shadow corresponding to the asset.

Certain presently-disclosed techniques, when implemented, can result in a more accurate depiction of the newly added objects when compared to existing techniques (e.g., "copy-paste" techniques) and are scalable (e.g., compared to creation of photorealistic frames by computer graphics artists). Additionally, when implemented, the disclosed techniques allow for datasets to be updated to include a more diverse set of frames that can be used to update or train perception systems. For example, in the case where a certain machine learning model in a perception system is observed as classifying motorcyclists with a lower degree of accuracy than bicyclists and not enough instances of motorcycles are present in the frames of the dataset, the presently disclosed techniques can be used to update the dataset and include more frames of motorcyclists. As a result, the machine learning models updated/trained using the dataset can be retrained or fine-tuned based at least on these updates and the overall performance of the corresponding perception systems can be improved. And because much of the original frames captured during real-world vehicle driving remain unchanged throughout the process, the updating/training is occurring on highly realistic frames as compared to simulation-based training, reducing the domain gap between real-world and synthetic frames. These and other benefits and advantages can be determined from this disclosure, such as from the discussion of the figures.

Figure 2B:
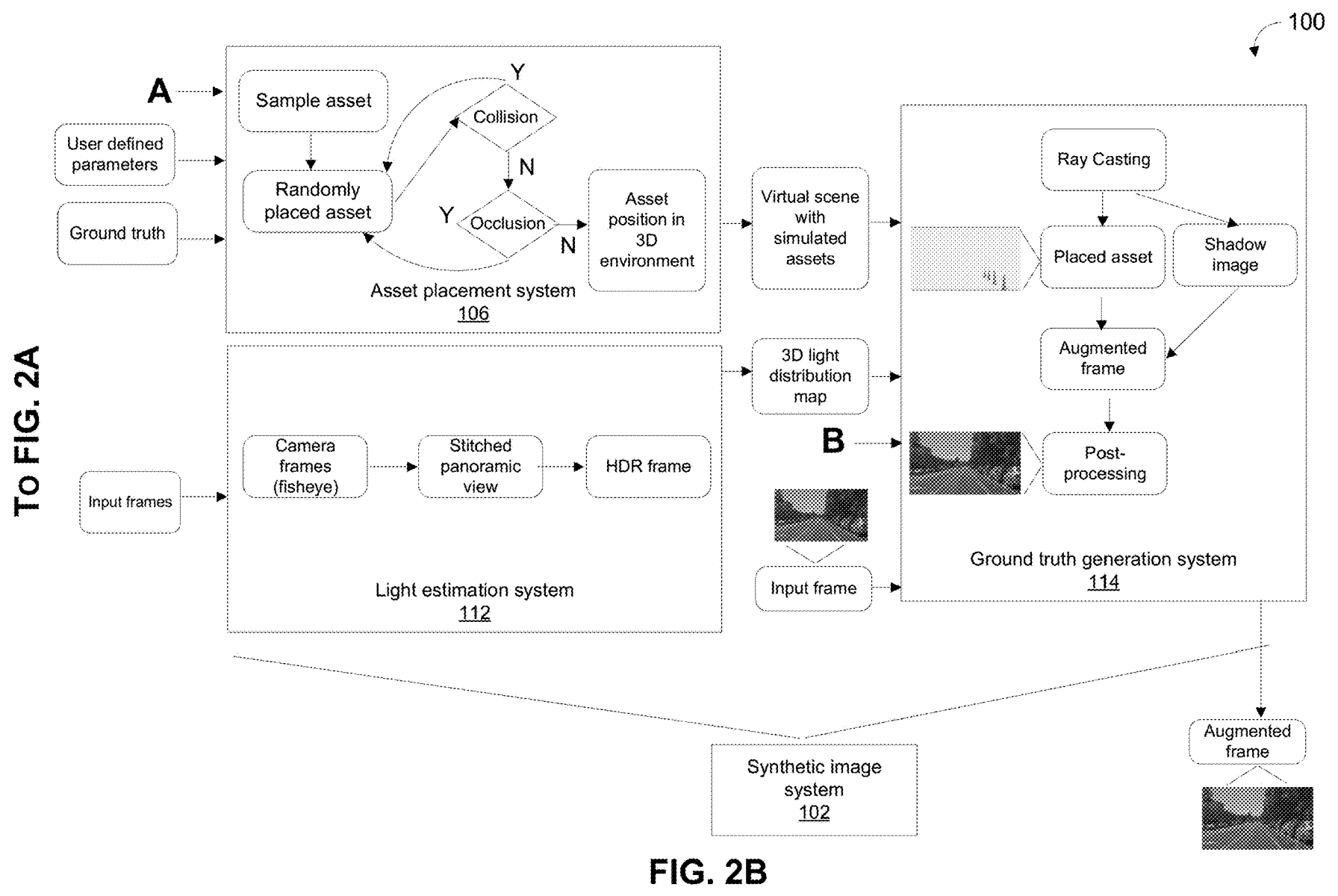

FIGS. 1, 2A, and 2B illustrate example data flow diagrams for a system of generating augmented training data for updating/training perception models, in accordance with some embodiments of the present disclosure.

Referring initially to FIG. 1, FIG. 1 is a block diagram illustrating an example system for generating augmented training data for updating/training perception models, in accordance with some embodiments of the present disclosure. As illustrated, the computing environment 100 includes synthetic image system 102. In some implementations, the synthetic image system 102 performs some and/or all of the functions described herein. For example, the synthetic image system 102 can include a 3D scene creation system 104, an asset placement system 106, an asset rendering system 108, a camera simulation system 110, a light estimation system 112, and/or a ground truth generation system 114. In some implementations, the 3D scene creation system 104, an asset placement system 106, an asset rendering system 108, a camera simulation system 110, a light estimation system 112, and/or a ground truth generation system 114 are implemented as hardware or software by the synthetic image system 102. For example, the synthetic image system 102 may include one or more computing devices (e.g., one or more computing devices that are the same as, or similar to, computing device 900 of FIG. 9). In this example, the synthetic image system 102 may include a computing device such as a laptop computer, a desktop computer, a server, a virtual machine, virtual hardware, and/or the like. In some implementations, the synthetic image system 102 may be associated with an entity that is generating and/or updating training data used by perception systems to classify objects, such entities including, for example, automated vehicle developers, entities providing data and/or services to automated vehicle developers, and/or the like.

The synthetic image system 102 can receive image data associated with one or more initial frames (e.g., images) and/or synthetic asset data associated with one or more assets. In examples, the one or more frames are initial frames captured by cameras positioned in fixed relation to a vehicle, the one or more frames representing an environment in which the vehicle is operating. In some examples, the synthetic asset data is associated with (e.g., is a 2D and/or 3D representation of) one or more assets to be included in an augmented frame. In some implementations, the synthetic image system 102 can provide augmented image data associated with one or more augmented frames. As described below the augmented frames may include one or more assets placed in a virtual scene. For example, the augmented frames may include one or more assets placed on a ground surface of a virtual scene. In another example, the augmented frames may include one or more assets placed on other surfaces associated with the asset (e.g., where the asset is expected to be placed) within the virtual scene. In some embodiments, the synthetic image system 102 may place one or more assets in the virtual scene based on the synthetic image system 102 determining (e.g., estimating) a ground plane.

FIGS. 2A and 2B are a block diagram illustrating an example data flow for a system of generating augmented training data for updating/training perception models in association with a computing environment 100. As illustrated, the outputs of FIG. 2A on the far-right of the figure feed into the input on the far-left side of the image of FIG. 2B. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

The systems and methods of the present disclosure allow for automatically generating large-scale augmented data for, e.g., rarely captured object scenarios. For example, as illustrated in FIG. 3, a real frame (left) 300A can be augmented in accordance with certain techniques described herein to create an augmented frame 300B with a barrier asset (right) in a realistic manner. The data generation pipeline described herein satisfies various requirements, including (1) multi-view consistent editing; (2) 3D labels; and (3) realistic editing. The systems and methods described herein can be associated with lighting estimation and virtual object insertion methods used in visual effects and the augmented, virtual and/or mixed reality industry, where the goal is to convincingly and seamlessly composite a virtual object into a given real-world frame. The systems and methods described herein implement various image editing techniques to generate simulated objects of interest, and can use the generated data to update or train machine learning models—such as perception models (e.g., a 3D object detection model).

The systems and methods of the present disclosure can include a synthetic image system 102 that generates augmented frames to address the long-tail distribution at the same time as maintaining a small domain gap with the real data. In accordance with certain synthetic data generation techniques, the entire scene can be simulated in a game engine. Such completely simulated scenarios—although they can offer more control over the scenario variations, which is essential in generating a larger distribution of the data-come with a larger distribution gap between the simulated and real domain. The present disclosure describes techniques that aim to reduce this domain gap by only simulating an augmented portion of a frame. As a result, and instead of generating the entire scene (e.g., foreground, background), systems implementing techniques described herein can render only the synthetic asset in each of the camera frames.

With continued reference to FIGS. 2A and 2B, the pipeline for rendering augmented asset frames can be divided into the following operations: (1) applying constraints on the input data; (2) recreating the minimalistic 3D virtual scene; (3) estimating lighting; (4) placing assets according to strategy; and/or (5) rendering the scene. As illustrated, these operations can be performed by a synthetic image system 102 of FIG. 1.

In some implementations, the synthetic image system 102 receives ground truth data (e.g., ground truth data associated with a ground truth which can include image data associated with one or more frames, data associated with the location of one or more objects in an environment, data associated with 2D bounding shape information, 3D cuboid information, free-space information, and/or the like); and/or camera parameter data associated with intrinsic parameters and extrinsic parameters of one or more cameras. The synthetic image system 102 can determine whether the ground truth data (e.g., one or more initial frames, a virtual scene, and/or the like) is appropriate for augmentation. For example, the synthetic image system 102 can determine whether the frames associated with the ground truth data provide a threshold amount of coverage of the environment in which a vehicle is operating (e.g., a vehicle that is the same as, or similar to, the vehicle 800 of FIGS. 8A-8D) relative to the vehicle. In some implementations, the image data is further associated with a data format (e.g., an image format such as JPEG, BMP, TIFF, and/or the like) which is the same as a data format that the synthetic image system 102 provides as an output. Additionally, or alternatively, the synthetic image system 102 can determine whether the image data is associated with (e.g., includes) intrinsic camera parameters and extrinsic camera parameters.

In some implementations, the synthetic image system 102 causes the 3D scene creation system 104 to generate (e.g., recreate) a virtual scene (e.g., a three-dimensional (3D) representation of the environment). For example, the synthetic image system 102 can cause the 3D scene creation system 104 to generate a virtual scene based at least on the ground truth data. In an example, the synthetic image system 102 causes the 3D scene creation system 104 to generate the virtual scene where the virtual scene is based at least on the one or more initial frames (included in the ground truth data) and lighting information (described below). The synthetic image system 102 can cause the 3D scene creation system 104 to generate the virtual scene such that annotations represented by the ground truth data are preserved in the virtual scene. In this way, the synthetic image system 102 can later determine the placement of assets (sometimes referred to as 3D synthetic assets) within the virtual scene as described below. In some implementations, the synthetic image system 102 can generate the virtual scene based at least on one or more intrinsic parameters and/or one or more extrinsic parameters of one or more cameras that were used to generate the one or more initial frames. In some implementations, the synthetic image system 102 may generate the virtual scene using image-based lighting. For example, the synthetic image system 102 may generate the virtual scene using image-based lighting where the image-based lighting is based at least on the lighting information described herein.

In some implementations, the synthetic image system 102 causes the 3D scene creation system 104 to generate the virtual scene, where the virtual scene is a set of 3D cuboids around the vehicle (sometimes referred to as an ego-machine). In some implementations, the synthetic image system 102 causes the 3D scene creation system 104 to output the virtual scene. The synthetic image system 102 may then provide the virtual scene as an input to the asset placement system 106.

In some implementations, the synthetic image system 102 causes the camera simulation system 110 to create camera objects. For example, the synthetic image system 102 can cause the camera simulation system 110 to receive camera parameter data associated with parameters of each camera associated with the vehicle that generated the frames associated with the ground truth data. The parameters may include, for example, extrinsic parameters (e.g., the position of the camera, the orientation or pose of the camera relative to the environment and/or the vehicle, and/or the like), intrinsic parameters (e.g., focal length, principal point, pixel size, distortion coefficients, and/or the like), a car mask (e.g., a predetermined set of pixels that correspond to features of the vehicle such as the hood, mirrors, the trunk, and/or the like), and/or other like parameters. In some implementations, the synthetic image system 102 causes the camera simulation system 110 to generate one or more camera objects corresponding to cameras installed on the vehicle. The synthetic image system 102 may then cause the camera simulation system 110 to provide the one or more camera objects to the ground truth generation system 114. It will be understood that camera objects can include, for example, virtual entities within a 3D scene that defines a perspective from which a final frame (e.g., an augmented image) is generated.

Figure 4:
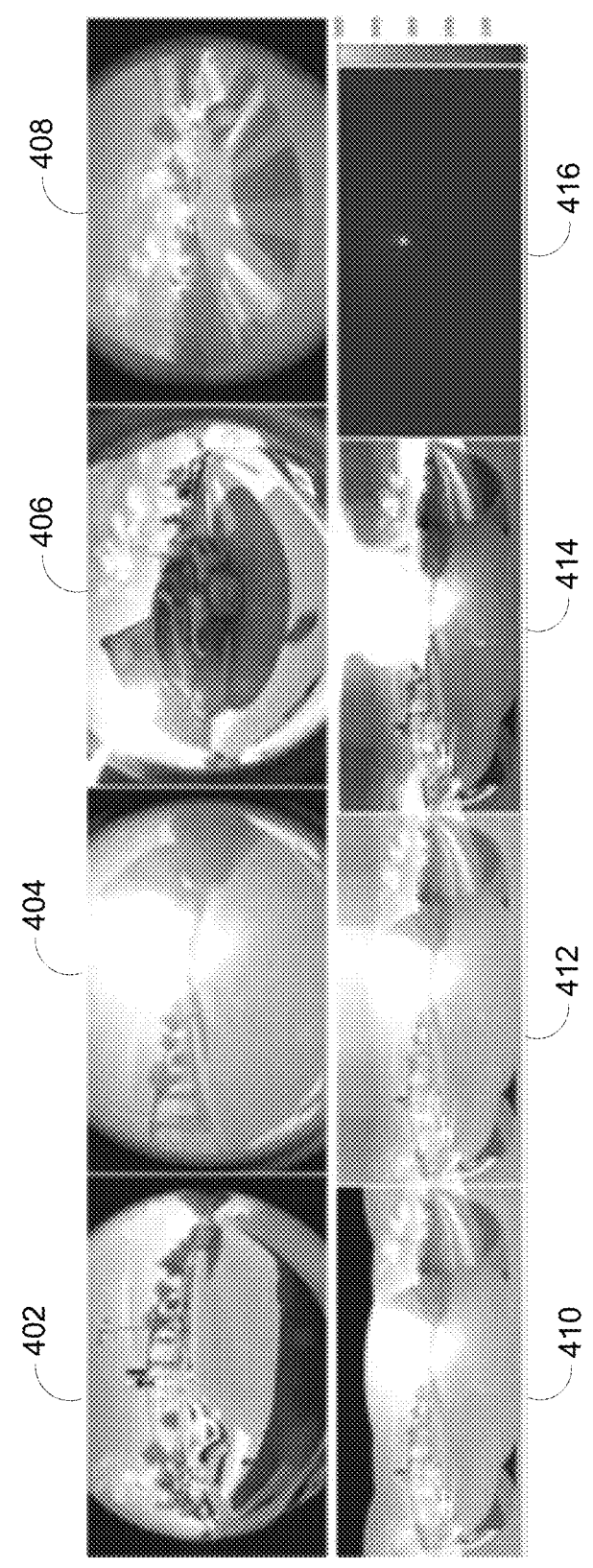
FIG. 4 is an example set of frames captured and generated in accordance with some embodiments of the present disclosure.

In some implementations, the cameras used may be a traditional camera, a fisheye camera, and/or the like. FIG. 4 illustrates frames 400 that may be used in accordance with the present disclosure. More specifically, FIG. 4 illustrates a step by step example of HDR light estimation with captured camera frames. As shown, the frames 400 include frames 402-408 that are captured by cameras (e.g., fisheye cameras) positioned along the left, front, right, and rear of the vehicle, respectively. And frames 410-416 are frames that may be generated using the techniques described herein. For example, frame 410 is a panoramic frame, frame 412 is an in-painted panoramic frame, frame 414 is an HDR panoramic frame, and frame 416 is a luminance frame representing light intensities associated with frame 414.

In some implementations, the synthetic image system 102 causes the light estimation system 112 to estimate (e.g., determine) lighting information (e.g., a 3D light distribution map) corresponding to one or more initial frames. The light information may be represented as a light map estimation of the light projected through the virtual scene and may include (e.g., represent) shadow information associated with one or more shadows and/or shade information associated with one or more shades formed by one or more objects in the scene. In some implementations, the synthetic image system 102 generates the lighting information based at least on the camera data and/or the camera parameter data described above (e.g., based at least on the one or more frames and the parameters corresponding to the one or more frames, respectively). In an example, the synthetic image system 102 causes the light estimation system 112 to generate the lighting information based at least on camera data associated with four fisheye cameras having a field-of-view of approximately 200 degrees, the four fisheye cameras being placed at 90 degree intervals relative to an origin (e.g., a center point) of the vehicle on which the cameras are positioned. Additionally, or alternatively, the synthetic image system 102 may cause the light estimation system 112 to generate the lighting information based at least on the parameters associated with the frames captured by the cameras (e.g., the fisheye cameras). In some implementations, the synthetic image system 102 causes the light estimation system 112 to convert the separate frames (e.g., the four frames corresponding to the four fisheye cameras at each time step) into a panoramic frame (e.g., a 360-degree equirectangular panorama). The synthetic image system 102 may cause the light estimation system 112 to convert the separate frames into the panoramic frame based at least on one or more stitching techniques such as, for example, in-painting. In this example, the synthetic image system 102 can cause the light estimation system 112 to update empty values corresponding to empty space associated with one or more pixels of the panoramic frame based at least on the one or more stitching techniques. When updating the empty values, the light estimation system 112 can implement fast marching when updating the empty values and filling in the pixels at the boundaries of the empty space. This can be done, for example, by taking the weight average of neighboring pixels and gradually moving inward.

Referring again to FIG. 4, frames 402-408 include low dynamic range (LDR) frames captured during operation of the vehicle. Because frames 402-408 were captured during a bright day, the resulting panoramic frames are referred to herein as LDR frames. This is because natural light in outdoor scenes can have intensity intervals that surpass ten orders of magnitude, with a contrast dynamic range reaching values as high as $10^{\char`\^}6$ on a bright, sunny day, and can wash out portions of the frame, resulting in little (if any) variation in pixel values in some portions of the frame.

To increase the dynamic range of frames (e.g., the panoramic frames), the synthetic image system 102 may cause the light estimation system 112 to generate a high dynamic range (HDR) frame based at least on the frames associated with the camera data, where the frames are LDR frames. For example, the synthetic image system 102 may cause the light estimation system 112 to provide the data associated with the frames to a machine learning model such as a deep neural network (DNN) that is updated/trained to output HDR frames based at least on receiving LDR frames as an input. In examples where the synthetic image system 102 causes the light estimation system 112 to provide data associated with LDR panoramic frames to the DNN, the synthetic image system 102 can then cause the light estimation system 112 to replace a portion of the LDR panoramic frame with the corresponding portion of the HDR panoramic frame output by the DNN. In one example, the synthetic image system 102 causes the light estimation system 112 to replace (e.g., concatenate, recombine, and/or the like) an upper half of the LDR panoramic frame (the portion associated with the sky). Optionally, the synthetic image system 102 may cause the light estimation system 112 to apply a Gaussian blur to the resulting panoramic frame (referred to as a recombined panoramic frame) to create a smooth light intensity profile. In some implementations, the synthetic image system 102 may cause the light estimation system 112 to generate the lighting information as described herein based at least on the recombined panoramic frame. The synthetic image system 102 may then provide the lighting information as a 3D light distribution map to the ground truth generation system 114.

With continued reference to FIG. 2B, the synthetic image system 102 may cause the asset placement system 106 to place one or more assets in the virtual scene. For example, the synthetic image system 102 may cause the asset placement system 106 to place one or more assets in areas in the environment where the assets are permitted (e.g., based at least on local or national driving laws and/or the like) to be located. In examples, the synthetic image system 102 may cause the asset placement system 106 to place one or more assets in areas in the environment associated with drivable surfaces. For example, the synthetic image system 102 may segment the scene and the determine one or more drivable surfaces (e.g., roadways, driveways, parking lots, and/or the like) where the asset can be placed. Additionally, or alternatively, the synthetic image system 102 may cause the asset placement system 106 to place one or more assets so as to avoid collisions and/or occlusions (e.g., with other assets and/or objects in the environment). In some implementations, the synthetic image system 102 may cause the asset placement system 106 to place one or more assets in a region of interest based at least on input received by a user. For example, the synthetic image system 102 may cause the asset placement system 106 to place one or more assets in a region of interest based at least on inputs received by a user indicating that the one or more assets should be placed at one or more positions and orientations, one or more orientations, and/or in one or more areas (e.g., in lanes of travel). In some implementations, the synthetic image system 102 may cause the asset placement system 106 to place one or more assets in a region of interest based at least on the asset placement system 106 determining a random position and orientation within the region of interest. In this case, the synthetic image system 102 may cause the asset placement system 106 to check whether the placement of the asset results in a collision with an existing object and/or one or more other assets in the environment. Additionally, or alternatively, the synthetic image system 102 may cause the asset placement system 106 to determine (e.g., check) whether the placement of the asset results in an occlusion by an existing object and/or one or more other assets in the environment. In some implementations, occlusions may be associated with a field-of-view of one or more cameras of the vehicle represented as camera objects. In some implementations, the synthetic image system 102 may cause the asset placement system 106 to render the asset to determine whether the asset is occluded based at least on the position and orientation at which the asset is placed and/or the camera object used to render the asset. In some implementations, the synthetic image system 102 may render one or more asset frames from within a virtual scene. For example, the synthetic image system 102 may render one or more asset frames from within a virtual scene such that at least one asset frame of the one or more asset frames includes (e.g., represents) the one or more assets. In examples, the synthetic image system 102 may render one or more asset frames from within a virtual scene such that at least one asset frame excludes other information in the scene and only includes the one or more assets. In some examples, the synthetic image system 102 may render one or more asset frames such that the one or more asset frames include an asset map corresponding to the one or more assets and a second asset map associated with a shadow map.

In some implementations, the synthetic image system 102 may cause the ground truth generation system 114 to render one or more frames representing the environment. For example, the synthetic image system 102 may cause the ground truth generation system 114 to render the asset based at least on the field-of-view of the one or more camera objects, the virtual scene (with assets located in the environment), the 3D light distribution map, and the one or more frames associated with the camera data (sometimes referred to as input images). In some implementations, the synthetic image system 102 may cause the ground truth generation system 114 to generate a shadow for the asset based at least on a virtual plane (e.g., a virtual plane extending along the ground or other surfaces on which assets are positioned). In some implementations, the synthetic image system 102 may cause the ground truth generation system 114 to render the asset and the corresponding shadow of the asset separately. In some implementations, the synthetic image system 102 may cause the ground truth generation system 114 to perform one or more post-processing operations such as adjust the shadow strength, simulate sensor models used to generate the initial frames, and/or create variation in the saturation of the rendered objects. The synthetic image system 102 may then cause the ground truth generation system 114 to combine the post-processed asset and shadow and alpha composite the rendered asset and shadow with the corresponding frame associated with the image data (the input frame) to generate (e.g., render) the augmented frame. In this example, the augmented frame can include an original frame associated with one or more initial frames, the original frame augmented with one or more assets from the one or more asset frames. In some implementations, the original frame can include a frame that is captured at a same time as the one or more initial frames. For example, the original frame can include a frame that is captured at a same time as the one or more initial frames using a different image sensor than the one or more images sensors used to capture the one or more initial frames. In this example, the different image sensor can include LiDAR sensors, RADAR sensors, and/or other image sensors as described herein. FIG. 5 illustrates an example set of augmented frames 500 where a first frame 502 is a frame associated with the image data, a second frame 504 is an augmented frame including assets but excluding their corresponding shadow, and a third frame 506 is an augmented frame including assets and their corresponding shadows.

In some embodiments, the synthetic image system 102 may generate ground truth data associated with the asset as rendered in the one or more asset frames. For example, the synthetic image system 102 may generate two-dimensional and/or three-dimensional bounding boxes based on the position in the environment where the synthetic image system 102 placed the asset. The synthetic image system 102 can then render the asset frames and associate the two-dimensional and/or three-dimensional bounding boxes with the rendered asset frames. In some embodiments, the synthetic image system 102 can determine one or more attributes associated with the bounding boxes (e.g., a fixed coordinate relative to the bounding box such as a top left X-coordinate (x_min), a top left Y-coordinate (y_min), a bottom right X-coordinate (x_max), a bottom right Y-coordinate (y_min), and/or the like) and the synthetic image system 102 can associated the rendered asset frames with the bounding boxes and the corresponding attributes.

In some embodiments, the synthetic image system 102 may update existing ground truth data associated with objects that were in the scene prior to placement of the asset (e.g., represented in the initial frame) based on the generated ground truth data. For example, the synthetic image system 102 may determine that one or more existing objects are affected (e.g., occluded from a field-of-view of a camera associated with the rendering of the augmented frame) based at least on the synthetic image system 102 placing the asset in the environment. In one example, the synthetic image system 102 may compare the initial frame with the augmented frame and the synthetic image system 102 can determine that one or more existing objects (e.g., at least a portion of the one or more objects) are affected. In this example, the synthetic image system 102 may update the existing ground truth data (e.g., one or more labels associated with the existing ground truth data, and/or the like) based at least on the generated ground truth data such that effect is accounted for in the generated ground truth data that corresponds to the augmented frame. Additionally, or alternatively, the synthetic image system 102 can update data associated with the augmented frame indicating whether portions of the frame correspond to free space. For example, once an asset is placed in the environment, the synthetic image system 102 can update the data associated with the augmented frame to indicate that a previously unoccupied space (e.g., clear roadway, clear sidewalk, and/or the like) is now occupied at the location of the asset. The synthetic image system 102 can then provide the augmented frame and/or the data corresponding to the augmented frame for training and/or updating of one or more perception models as described herein.

Figure 6:
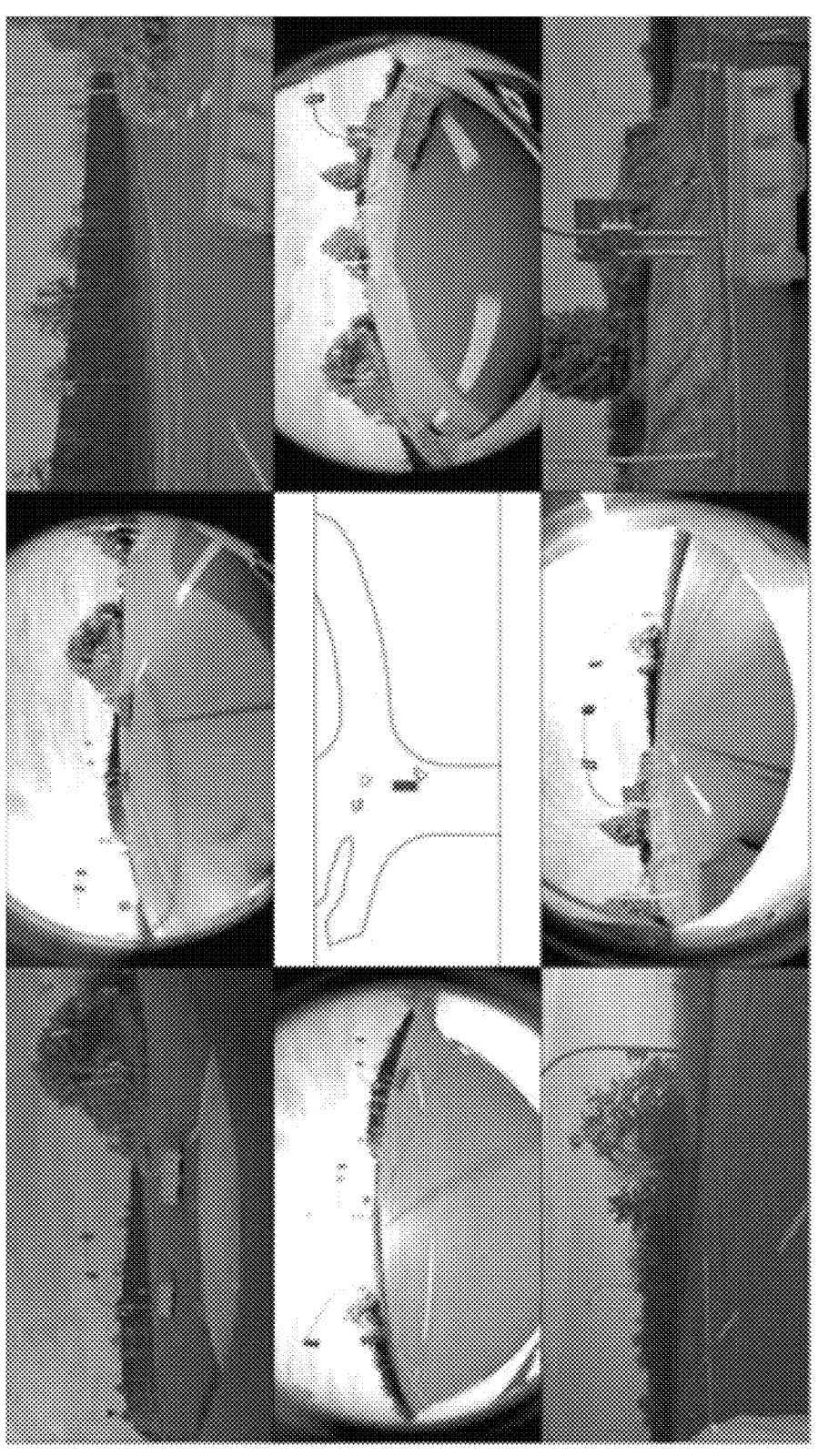
FIG. 6 is an example set of frames rendered in accordance with some embodiments of the present disclosure.

FIG. 5 illustrates the results 500 of realistic augmentation as described herein, where the left frame 502 is an original frame, the center frame 504 is augmentation without shadow and shade, and the right frame 506 is augmented with shadow and shade. FIG. 6 illustrates multi-camera synthetic asset rendering using the realistic augmentation techniques described herein.

Now referring to FIG. 7, each block of method 700, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 700 is described by way of example, with respect to FIGS. 1-6. However, this method 700 may additionally, or alternatively, be executed by any one system or any combination of systems including, but not limited to, those described herein.

FIG. 7 is a flow diagram showing a method 700 for model training in autonomous systems and applications, in accordance with some embodiments of the present disclosure. The method 700 may be implemented by one or more systems, devices, or components discussed herein.

The method 700, at block 702, includes receiving data associated with a set of initial frames. For example, the synthetic image system (e.g., synthetic image system that is the same as, or similar to, the synthetic image system 102 of FIGS. 1-2B) may receive the data associated with the set of initial frames. The set of initial frames can include one or more frames (referred to interchangeably as frames or images throughout where contextually appropriate) that represent an environment of a vehicle (e.g., a vehicle that is the same as, or similar to, the vehicle 800 of FIG. 8A). In some implementations, the initial frames are captured by one or more cameras (e.g., a plurality of cameras) that are positioned in fixed relation relative to the vehicle.

The method 700, at block 704, includes generating a panoramic frame based at least on the set of initial frames. For example, the synthetic image system may generate a panoramic frame based at least on the set of initial frames. In some implementations, where a single, omnidirectional camera is used to capture the one or more frames the synthetic image system may forgo generating a panoramic frame. Additionally, or alternatively, where a single, omnidirectional camera is used to capture the one or more frames and the one or more frames are partially covered (e.g., occluded), the synthetic image system may forgo generating a panoramic frame. In this way, one or more of the functions discussed with respect to block 704 may be implemented optionally.

In some implementations, the synthetic image system generates the panoramic frame based at least on least on determining a set of intrinsic parameters. For example, the synthetic image system may generate the panoramic frame based at least on the synthetic image system determining a set of intrinsic parameters that are associated with one or more cameras that captured the one or more initial frames. Additionally, or alternatively, the synthetic image system may generate the panoramic frame based at least on determining a set of extrinsic parameters. For example, the synthetic image system may generate the panoramic frame based at least on the synthetic image system determining a set of extrinsic parameters that are associated with one or more cameras that captured the one or more initial frames. In these examples, the synthetic image system may determine the intrinsic and/or extrinsic camera parameters based at least on (e.g., during) a calibration process whereby the camera(s) are calibrated.

In some implementations, when generating a panoramic frame, the synthetic image system determines a frame overlap associated with two or more frames. For example, the synthetic image system may determine that one or more of the frames overlap by a threshold amount (e.g., the frames each represent corresponding fields of view that capture common areas in the environment). In this example, the synthetic image system may compare the overlap to an overlap threshold (e.g., a percentage of overlap, a finite number of overlapping pixels, and/or the like) and the synthetic image system may generate the panoramic frame based at least on determining that the overlap satisfies the overlap threshold. Additionally, or alternatively, the synthetic image system may forgo generating the panoramic frame based at least on determining that the overlap does not satisfy the threshold.

The method 700, at block 706, includes providing data associated with a frame to a model to cause the model to generate a panoramic HDR frame. For example, the synthetic image system may provide the data associated with a panoramic frame (e.g., an LDR panoramic frame) to a model to cause the model to generate the panoramic HDR frame.

In this example, the model may be updated or trained to provide an output, where the output is a representation of the input frame (e.g., the panoramic frame) which is transformed from an LDR frame into the HDR frame. In some implementations, where only one frame is received, the synthetic image system may provide the data associated with the one frame to the model to cause the model to generate an output, where the output is a representation of the input frame (e.g., the single image) which is transformed from an LDR frame to an HDR frame. In examples, when transforming LDR frames to HDR frames, the synthetic image system may adjust the range of brightness of one or more pixels in the frames such that contrast increases when comparing the LDR frames to the corresponding HDR frames. In some implementations, where the synthetic image system receives an HDR frame (e.g., where the data associated with the set of initial frames comprises camera images that are preprocessed to transform the initial frames from LDR frames to HDR frames), the synthetic image system may provide data associated with the HDR frame to the model to cause the model to transform (e.g., update) the HDR frame (e.g., to further improve the contrast of the HDR frame that is input into the model).

The method 700, at block 708, includes determining a light distribution map based at least on the stitched HDR frame. For example, the synthetic image system may determine the light distribution map based at least on the panoramic HDR frame. In some implementations, the synthetic image system may determine the light distribution map based at least on the panoramic frame and the panoramic HDR frame. For example, the synthetic image system may determine the light distribution map based at least on the panoramic frame and the panoramic HDR frame, where at least a portion (e.g., a first portion) of the light distribution map corresponds to at least a portion of the panoramic frame and at least another portion (e.g., a second portion) of the light distribution map corresponds to at least a portion of the panoramic HDR frame. In this way, the synthetic image system may update half of the original frame (e.g., the panoramic frame) by updating the panoramic frame such that a portion of the light distribution map is associated with pixels corresponding to the HDR frame to create the light distribution map.

The method 700, at block 710, includes determining a virtual scene. For example, the synthetic image system may determine the virtual scene. The virtual scene may include a set of 3D cuboids. Additionally, or alternatively, the virtual scene may include a neural radiance field (NeRF).

The method 700, at block 712, includes rendering an asset and a shadow on at least one of the initial frames (sometimes referred to as rendering asset frames). For example, the synthetic image system may render an asset and a shadow on at least one of the initial frames. In this example, the resulting initial frames are sometimes referred to as an augmented frame. In some implementations, the synthetic image system renders an asset and a shadow on at least one of the initial frames based at least on the virtual scene and the light distribution map. For example, the synthetic image system may render the asset and the shadow on at least one of the initial frames such that the shadow is a shadow that corresponds to the asset.

In some implementations, the synthetic image system renders the asset and the shadow based at least on a random position and orientation. In examples, the random position and orientation is a position and orientation in the virtual scene. In such examples, the synthetic image system may render the asset and the shadow at the random position and orientation within the 3D environment. Additionally, or alternatively, the synthetic image system renders the asset and the shadow based at least on the random position and/or a random orientation.

In some implementations, the synthetic image system determines a region of interest. For example, the synthetic image system may determine a region of interest based at least on the virtual scene. In this example, the synthetic image system may then determine a position and orientation for the asset (e.g., a position and orientation at which to render the asset and the shadow) based at least one the region of interest. The synthetic image system may then render the asset and the shadow based at least on the position and orientation of the asset. In some implementations, the position and orientation is determined by the synthetic image system such that the position and orientation is associated with a position and orientation in a region of interest and an orientation of the asset at the position and orientation.

In some implementations, the synthetic image system determines a first position and orientation for the asset. For example, the synthetic image system may determine a first position and orientation for the asset based at least on the virtual scene. In examples, and similar to as described above, the first position and orientation represents both a position and orientation and an orientation for the asset. In some implementations, the synthetic image system may determine that the asset is occluded by at least one object. For example, the synthetic image system may determine that the asset is occluded by at least one object in an individual frame or in the set of frames (e.g., within a field-of-view of a camera object). In this example, the synthetic image system may determine that the at least one asset is occluded based at least on the first position and orientation for the asset and a position and orientation of the object occluding the asset in the virtual scene. In some implementations, the synthetic image system determines a second position and orientation for the asset. For example, the synthetic image system may determine a second position and orientation for the asset in the virtual scene based at least on the synthetic image system determining that the asset is occluded in the at least one camera frame. In this way, the synthetic image system can provide rendered frames as an output where assets rendered in the rendered frames are known to be at least partially visible. In some implementations, the synthetic image system renders the asset and the shadow based at least on the second position and orientation for the asset.

In some implementations, the synthetic image system determines a first position and orientation for the asset based at least on the virtual scene. For example, the synthetic image system can determine the first position and orientation for the asset based at least one the virtual scene similar to as described above. In some implementations, the synthetic image system determines that the asset is occluded in the at least one camera frame based at least on determining that a portion of the asset is overlapped by an object. For example, the synthetic image system determines that the asset is occluded in the at least one camera frame based at least on determining that a portion of the asset is overlapped by an object, where the portion of the asset being overlapped by the object is overlapped by a threshold amount. In this example, the threshold amount may be associated with a predetermined number of pixels that overlap, an area that overlaps, and/or the like. In some implementations, the synthetic image system determines a second position and orientation for the asset in the virtual scene. For example, the synthetic image system can determine the second position and orientation for the asset in the virtual scene based at least on determining the asset is occluded in the at least one camera frame (e.g., satisfying the threshold amount). The synthetic image system may then render the asset and the shadow based at least one the second position and orientation for the asset (similar to as described above).

Example Autonomous Vehicle

Figure 8A:
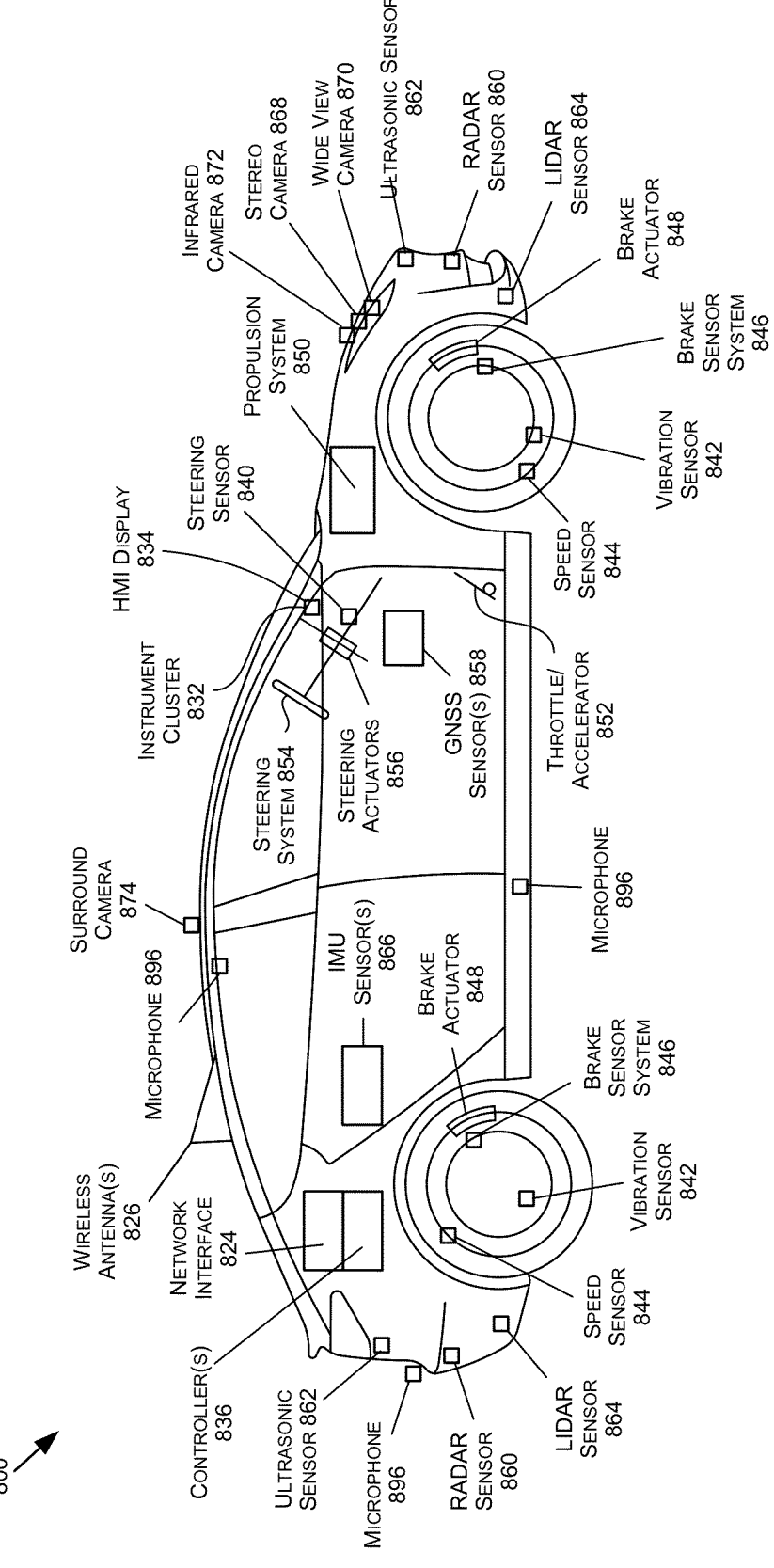
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LiDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
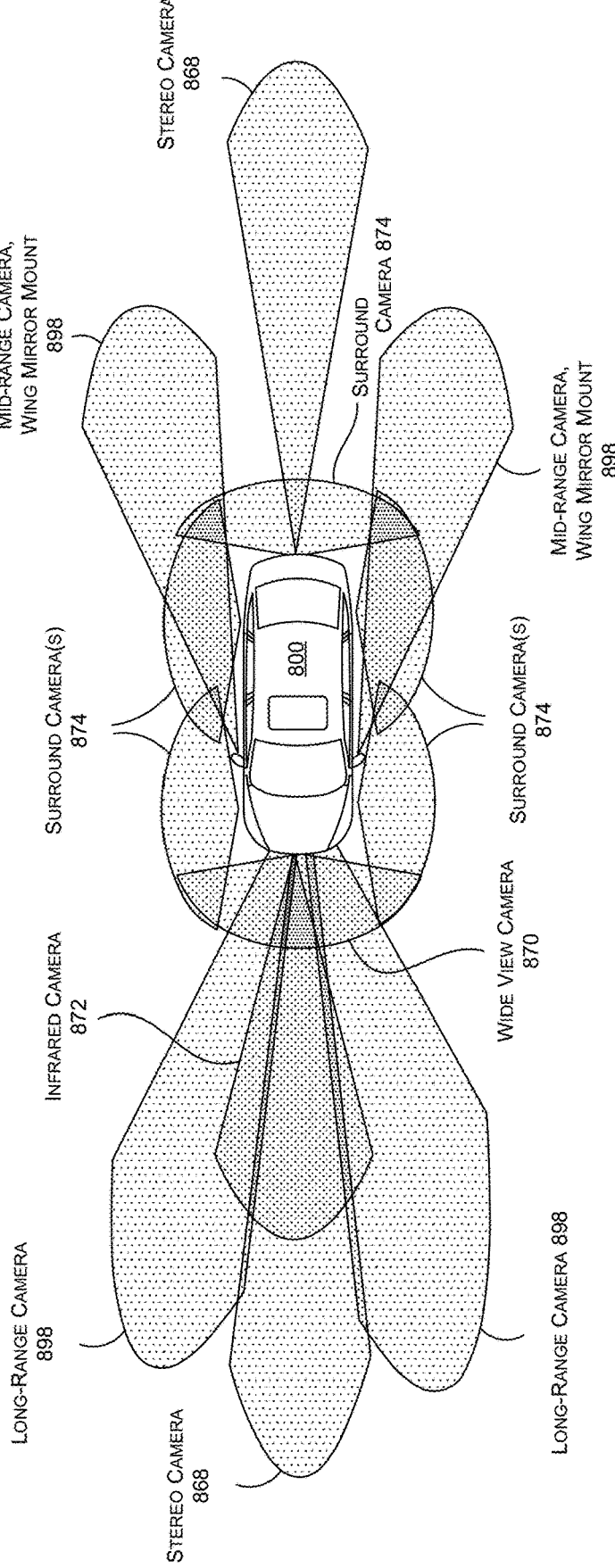
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red clear blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
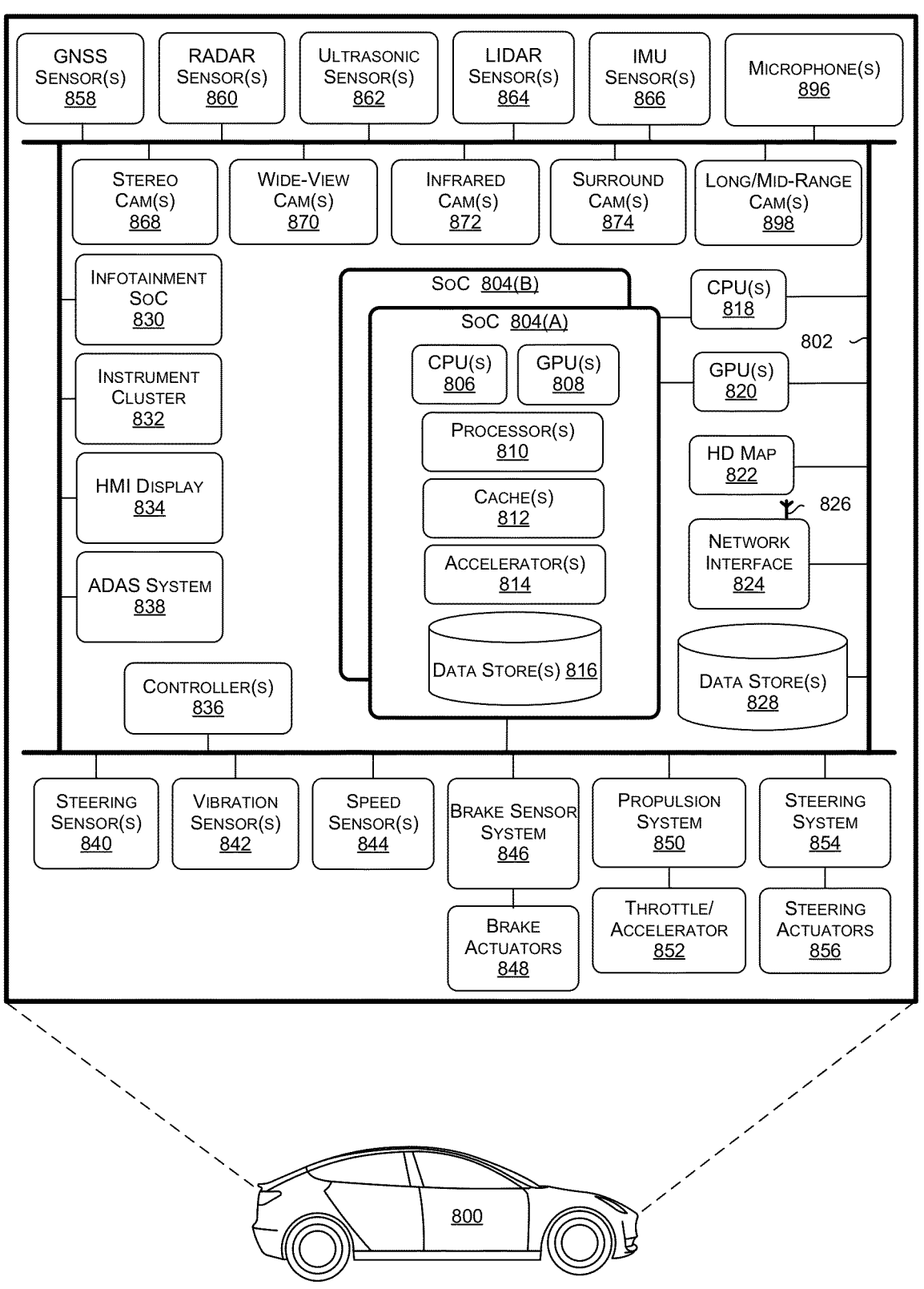
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LiDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LiDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based at least on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LiDAR sensor(s) 864. The LiDAR sensor(s) 864 may be used for object and pedestrian detection, emergency braking, collision avoidance, and/or other functions. The LiDAR sensor(s) 864 may be functional safety level ASIL B. In some examples, the vehicle 800 may include multiple LiDAR sensors 864 (e.g., two, four, six, etc.) that may use Ethernet (e.g., to provide data to a Gigabit Ethernet switch).

In some examples, the LiDAR sensor(s) 864 may be capable of providing a list of objects and their distances for a 360-degree field of view. Commercially available LiDAR sensor(s) 864 may have an advertised range of approximately 700 m, with an accuracy of 2 cm-3 cm, and with support for a 700 Mbps Ethernet connection, for example. In some examples, one or more non-protruding LiDAR sensors 864 may be used. In such examples, the LiDAR sensor(s) 864 may be implemented as a small device that may be embedded into the front, rear, sides, and/or corners of the vehicle 800. The LiDAR sensor(s) 864, in such examples, may provide up to a 120-degree horizontal and 35-degree vertical field-of-view, with a 200 m range even for low-reflectivity objects. Front-mounted LiDAR sensor(s) 864 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 800. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LiDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based at least on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 784(A)-784(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based at least on training performed at a datacenter (e.g., using the server(s) 878 and/or other servers).

The server(s) 878 may be used to update or train machine learning models (e.g., neural networks) based at least on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
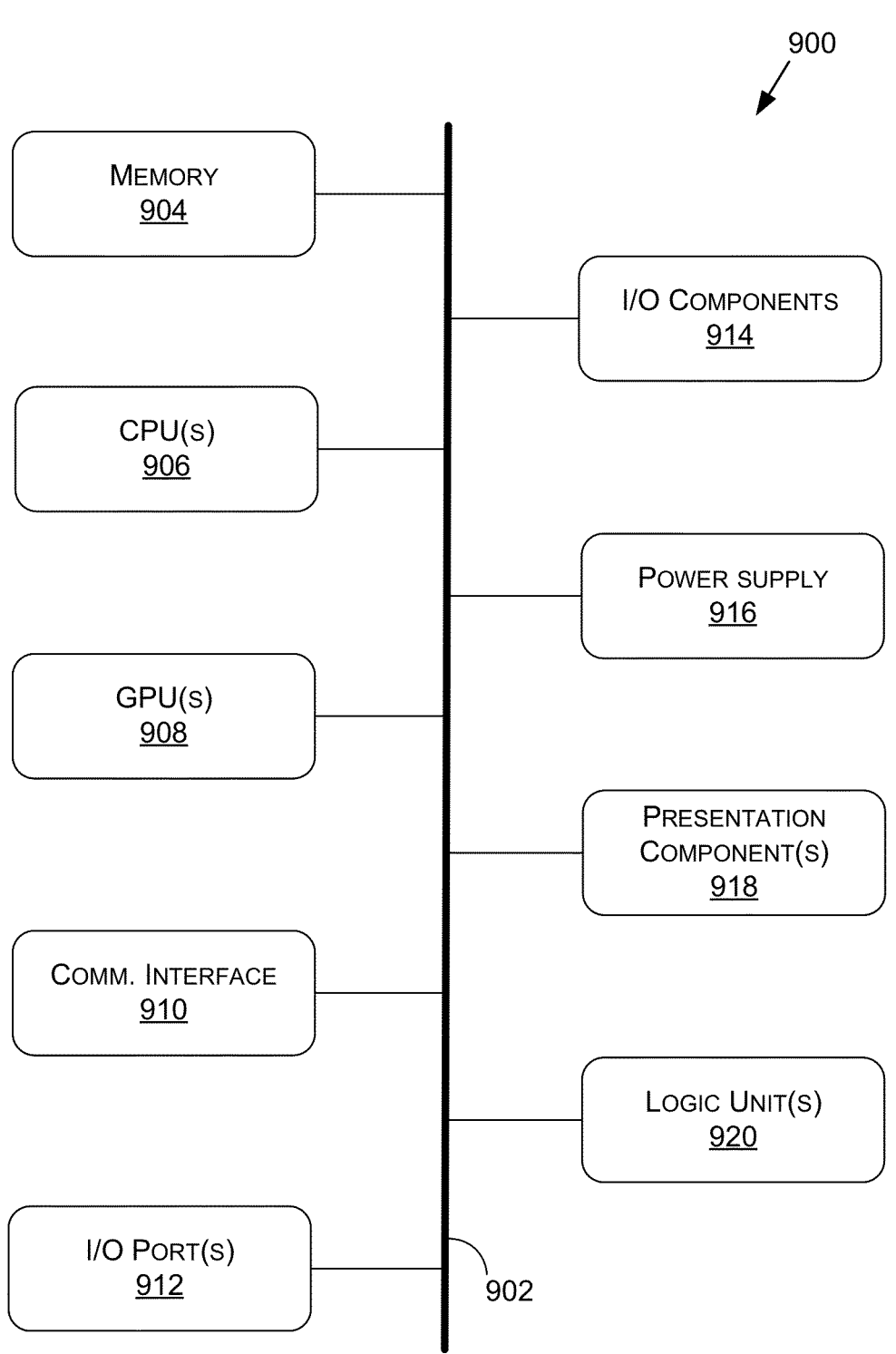
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
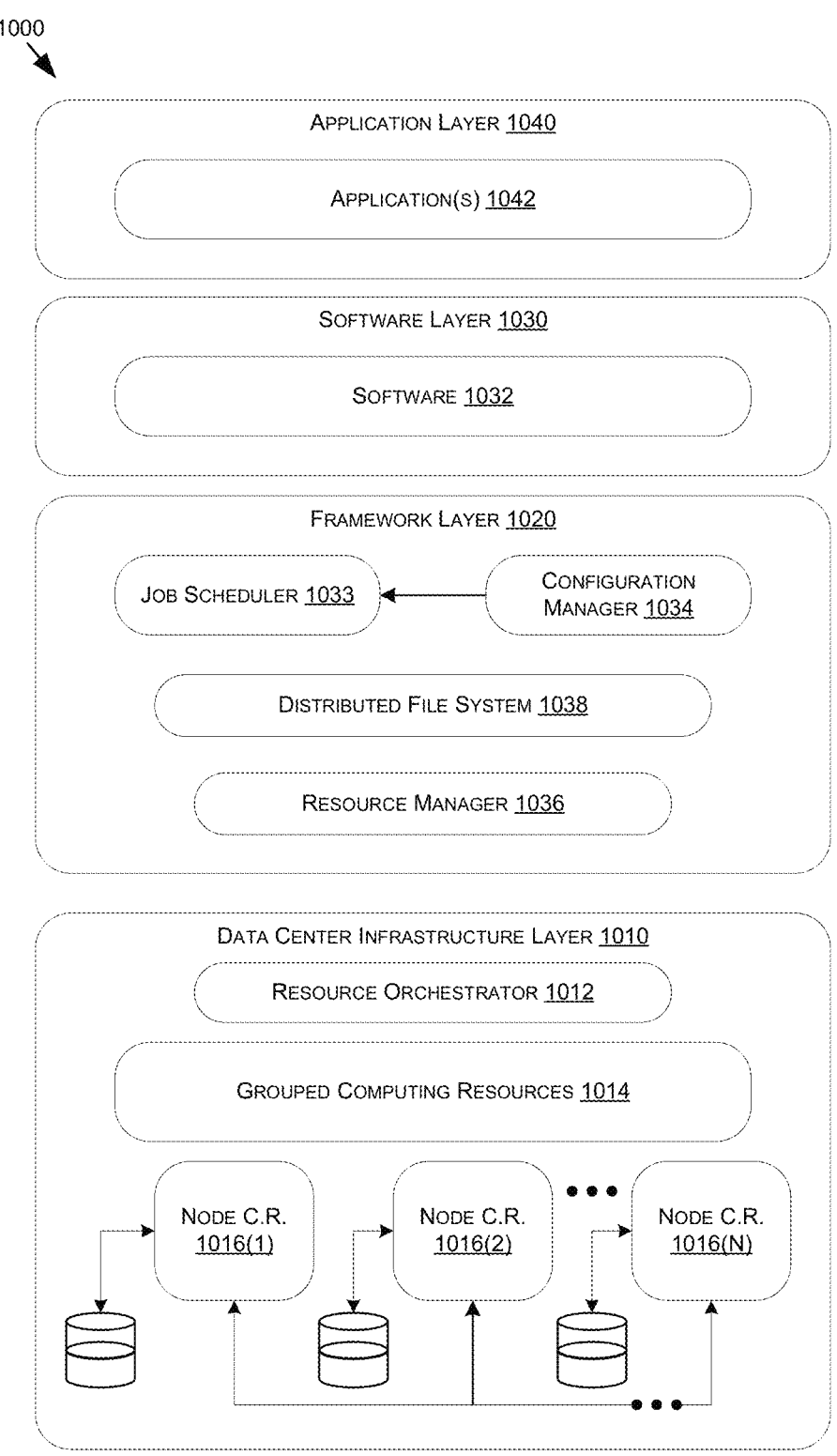
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based at least on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to update or train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to update/train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
one or more circuits to:
determine lighting information associated with a light distribution map obtained using a high dynamic range (HDR) panoramic view frame;
determine a virtual scene;
determine a position and orientation for an asset based at least on the virtual scene;
determine that the asset is overlapped by an object in the virtual scene, by at least a threshold amount, based on the position and orientation of the asset; and
render, on a frame, and based at least on the virtual scene, the asset being overlapped in the virtual scene, and the light distribution map, a shadow corresponding to the asset.

2. The one or more processors of claim 1, wherein, when rendering the asset and the shadow, the one or more circuits are to:
determine a random position and orientation for the asset based at least on the virtual scene, and render the asset and the shadow based at least on the random position.

3. The one or more processors of claim 1, wherein, when rendering the asset and the shadow, the one or more circuits are to:
determine a region of interest based at least on the virtual scene;
determine a position and orientation for the asset based at least on the region of interest; and
render the asset and the shadow based at least on the position and orientation for the asset.

4. The one or more processors of claim 1, wherein, when rendering the asset and the shadow, the one or more circuits are to:
determine that the asset is occluded by the object in the frame based at least on the position and orientation for the asset and a position of the object in the virtual scene;
determine a second position and orientation for the asset based at least on determining that the asset is occluded in the frame; and
render the asset and the shadow based at least on the second position and orientation for the asset.

5. The one or more processors of claim 1, wherein, when rendering the asset and the shadow, the one or more circuits are to:
determine a second position and orientation for the asset based at least on determining that the asset is occluded in the frame; and
render the asset and the shadow based at least on the second position and orientation for the asset.

6. The one or more processors of claim 1, wherein, when determining the light distribution map, the one or more circuits are to:
generate a panoramic view frame based at least on the frame; and
determine the light distribution map based at least on the panoramic view frame and the HDR panoramic view frame, where a first portion of the light distribution map corresponds to at least a portion of the panoramic view frame, and where a second portion of the light distribution map corresponds to at least a portion of the HDR panoramic view frame.

7. The one or more processors of claim 6, wherein, when generating the panoramic view frame, the one or more circuits are to:
generate the panoramic view frame based at least on determining at least one of a set of intrinsic parameters or a set of extrinsic parameters associated with one or more cameras.

8. The one or more processors of claim 6, wherein, when generating the panoramic view frame, the one or more circuits are to:
determine that a set of frames satisfy an overlap threshold; and
generate the panoramic view frame based at least on determining that the set of frames satisfy the overlap threshold.

9. The one or more processors of claim 1, wherein, when determining the virtual scene, the one or more circuits are to:
determine the virtual scene to comprise a set of 3D cuboids or a neural radiance field (NeRF).

10. The one or more processors of claim 1, wherein the one or more processors is comprised in at least one of:
a control system for an autonomous or semi-autonomous machine;

a perception system for the autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system that implements one or more large language models (LLMs);

a system for generating synthetic data;

a system incorporating one or more virtual machines (VMs);

a system implemented at least partially in a data center; or a system implemented at least partially using cloud computing resources.

11. A system comprising:

one or more processors to perform operations comprising:

determining lighting information associated with a light distribution map obtained using one or more high dynamic range (HDR) frames;

determining a virtual scene corresponding to an asset;

determining a position and orientation for the asset based at least on the virtual scene;

determining that the asset is overlapped by an object in the virtual scene, by at least a threshold amount, based at least on the position and orientation for the asset; and rendering, within a frame, and based at least on the virtual scene, the asset being overlapped in the virtual scene, and the light distribution map, a shadow corresponding to the asset.

12. The system of claim 11, wherein, when rendering the asset and the shadow, the one or more processors perform the operations of:

determining a random position and orientation for the asset based at least on the virtual scene, and rendering the asset and the shadow based at least on the random position and orientation.

13. The system of claim 11, wherein, when rendering the asset and the shadow, the one or more processors perform the operations of:

determining a region of interest based at least on the virtual scene;

determining a position and orientation for the asset based at least on the region of interest; and rendering the asset and the shadow based at least on the position and orientation for the asset.

14. The system of claim 11, wherein, when rendering the asset and the shadow, the one or more processors perform the operations of:

determining that the asset is occluded by the object in the frame based at least on the position and orientation for the asset and a position of the object in the virtual scene;

determining a second position and orientation for the asset based at least on determining that the asset is occluded in the frame; and rendering the asset and the shadow based at least on the second position and orientation for the asset.

15. The system of claim 11, wherein, when rendering the asset and the shadow, the one or more processors perform the operations of:

determining a second position and orientation for the asset based at least on determining that the asset is occluded in the frame; and rendering the asset and the shadow based at least on the second position and orientation for the asset.

16. The system of claim 11, wherein, when determining the light distribution map, the one or more processors perform the operation of:

determining the light distribution map based at least on the frame and the one or more HDR frames, where a first portion of the light distribution map corresponds to at least a portion of the frame and a second portion of the light distribution map corresponds to at least a portion of the one or more HDR frames.

17. The system of claim 11, wherein, when determining the virtual scene, the one or more processors perform the operation of:

determining the virtual scene to comprise a set of 3D cuboids or a neural radiance field (NeRF).

18. The system of claim 11, wherein the determining of the virtual scene for the asset includes using the light distribution map to render the asset within the virtual scene.

19. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. A method comprising:

estimating lighting information corresponding to one or more initial frames;

recreating a virtual scene corresponding to the one or more initial frames using the lighting information;

placing one or more assets within the virtual scene;

rendering one or more asset frames from within the virtual scene, at least one asset frame of the one or more asset frames including the one or more assets;

determining a position and orientation for the one or more assets based at least on the virtual scene;

determining that the one or more assets are overlapped by an object in the virtual scene, by at least a threshold amount, based at least on the position and orientation for the one or more assets; and rendering an augmented frame including an original frame associated with the one or more initial frames augmented with the one or more assets from the one or more asset frames.

* * * * *